April 19, 1960 HANS-JOACHIM JABCZYNSKI 2,933,562

AUTOMATIC TELEPHONE SWITCHES HAVING MEANS FOR LIMITING THE TESTING INTERVAL

Filed March 9, 1953 2 Sheets-Sheet 1

Inventor:
Hans Joachim Jabczynski
By [signature] Atty.

April 19, 1960 HANS-JOACHIM JABCZYNSKI 2,933,562

AUTOMATIC TELEPHONE SWITCHES HAVING MEANS FOR LIMITING THE TESTING INTERVAL

Filed March 9, 1953 2 Sheets-Sheet 2

Inventor:
Hans Joachim Jabczynski
By [signature] Atty.

United States Patent Office 2,933,562

Patented Apr. 19, 1960

2,933,562

AUTOMATIC TELEPHONE SWITCHES HAVING MEANS FOR LIMITING THE TESTING INTERVAL

Hans-Joachim Jabczynski, Berlin-Zelendorf, Germany, assignor to Siemens & Halske Aktiengesellschaft, Munich, Germany, a corporation of Germany Application March 9, 1953, Serial No. 341,114

Claims priority, application Germany March 14, 1952

7 Claims. (Cl. 179—18)

This invention relates to signalling systems and is particularly concerned with a circuit arrangement for defining the testing time intervals in an automatic telephone system employing discharge tubes for establishing the idle condition of lines or trunks.

The characteristic feature of the circuit arrangement according to the invention is that the discharge tubes can become operative to stop the switch wipers in engagement with an idle line, under control of a potential which marks the idle condition thereof, only in the simultaneous presence of an auxiliary or additional potential acting on the tubes, such additional potential being for each line reached by the wipers of the corresponding switch over bank contacts connected only once during an interval determined by the movement of the wipers with respect to the bank contacts during which interval the stopping of the switch wipers can be reliably obtained.

Figure 1:
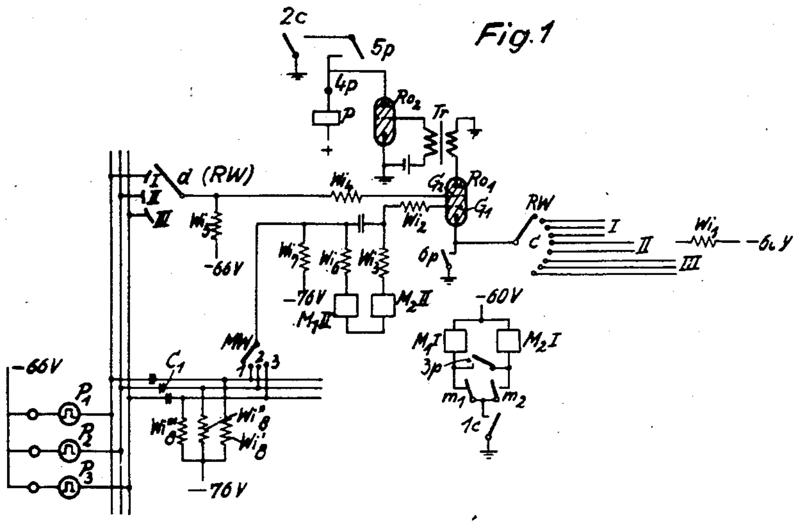
Figure 2:
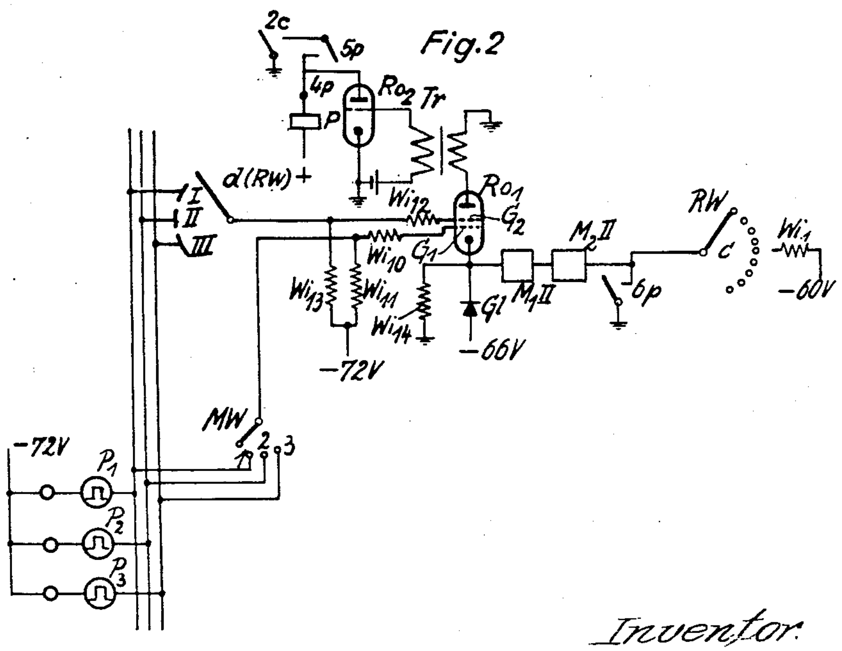
Figure 3:
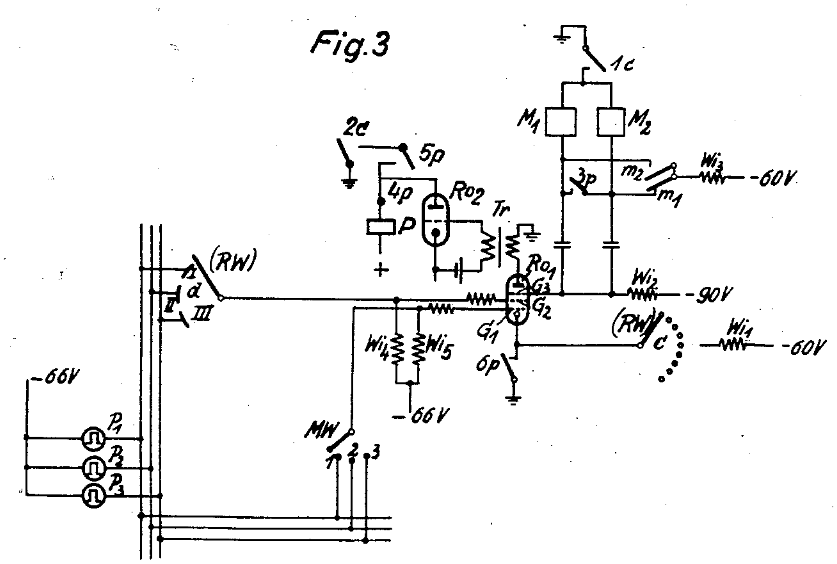

The various objects and features of the invention will be explained with reference to the accompanying drawings Figs. 1–3 showing in diagrammatic manner embodiments in connection with switches comprising wipers which are operated by a plurality of alternately actuated magnets.

Fig. 1 shows only the test or private wiper *c* and the control wiper *d* of a selector switch RW. The line wipers which are disposed in the talking path have been omitted. The switch RW is a well known motor-operated switch comprising two drive magnets which are alternately closed and opened under control of the switch operation. An example of a motor for a switch of this kind is disclosed in U.S. Patent No. 2,002,546, dated May 28, 1935; an example of a switch is disclosed in U.S. Patent No. 2,701,824, dated February 5, 1955.

The switch RW is seized for extending a call, for example, by a preceding switching device, causing in well known manner actuation of a seizure relay (not shown) which closes contacts such as contacts 1*c* and 2*c*. Responsive to closure of contact 1*c*, the drive magnets $M_1$ and $M_2$ each having two windings indicated respectively by $M_1$I, $M_1$II and $M_2$I, $M_2$II, are by contacts $m_1$ and $m_2$, which are mechanically controlled during the switch operation, over their windings $M_1$I and $M_2$I, so affected that the magnet $M_1$ (winding $M_1$II) is initially in an operating circuit over the contact $m_1$, thereby rotating the armature which drives the switch shaft, until the armature becomes affected by the magnet $M_2$ ($M_2$I) under control of the contact $m_2$ which is closed by the rotation of the switch shaft. The magnet $M_2$ (winding $M_2$I) thereupon continues to rotate the armature until such armature is again affected by the magnet $M_1$ (winding $M_1$I) which in the meantime has become connected over the contact $m_1$ by the switch rotation. The contact $m_2$ is thereby opened again. The stopping is effected in a manner to be presently explained, upon energization of relay P which operates its contact 3*p* to cause energization of both magnet windings $M_1$I and $M_2$I.

The wipers of the switch RW, which is operable as above described, has access to three groups of bank contacts which are respectively connected with groups of lines or trunks I, II and III. The desired group is determined by setting a switch MW in accordance with the number dialled, whereby this switch may be set with its wiper in engagement with the contacts 1, 2 or 3. The switch MW may be set in any suitable and desired known manner; the precise actuation or mode of operation of switch MW has no bearing on the invention. The various trunk or line groups are marked by brief impulses $P_1 \ldots P_3$ which are at different times periodically transmitted by a generator. In accordance with the wiring scheme shown in the drawing, there will be at the contact 1 of the switch MW, at a definite instant, the impulse $P_1$; at the contact 2, at a definite other instant, there will appear the impulse $P_2$; and at the contact 3 will similarly appear the impulse $P_3$ at a definite further instant.

The impulse which is at any instant effective at a bank contact of the switch MW will also appear at the corresponding bank contact associated respectively with trunk groups I, II and III, accessible to the wiper *d* of the switch RW.

If it is assumed that the wiper of the switch MW is set on the contact 2, the impulse $P_2$ will appear on the grid $G_1$ of the discharge tube $Ro_1$ and at the same time on the grid $G_2$ at the instant when the wiper *d* of the switch RW namely, wiper *d* (RW) sweeps over the segmental contact II. At the grid $G_1$ is connected −76 volts in a circuit extending over the resistors $Wi_7$ and $Wi_6$, windings II of the magnets $M_1$ and $M_2$ (marked $M_1$II and $M_2$II), and resistors $Wi_3$ and $Wi_2$. Also connected to the grid $G_1$, after the setting of the switch MW on bank contact 2, will be −76 volts over a circuit including the resistor $Wi_8$. Therefore, at the instant when the impulse $P_2$ appears (+6 volt), the potential at the grid $G_1$ will be raised to −70 volt. This potential on the grid $G_1$ is opposed by a potential induced in the windings II of the magnets $M_1$ and $M_2$ (marked $M_1$II; $M_2$II) (e.g., +10 volt) due to actuation of the control contacts $m_1$ and $m_2$, so that there will appear upon occurrence of the impulse $P_2$ (+6 volt) a potential on the grid $G_1$ on the order of −60 volt. At the grid $G_2$ is a potential of −66 volt, in a circuit over the resistors $Wi_5$ and $Wi_4$ as well as over the control wiper *d* and the generator. When the wiper *d* is in engagement with the segmental contact II (corresponding to the desired trump group) there will be upon appearance of the impulse $P_2$ (+6 volt) a potential of −60 volt at the same time as it appears at the grid $G_1$.

If the switch wiper *c* of the switch RW engages at such instant bank contact of an idle line in the group II, the idle condition of which is marked by a potential of −60 volt over a resistor $Wi_1$, the identical potential of −60 volt will appear at the cathode of the tube $Ro_1$ and such tube will become conductive.

Inasmuch as the opposing potential (e.g., +10 volt) which is induced in the magnet windings $M_1$II and $M_2$II appears thereon, as already mentioned only for brief instant and only once when the switch wiper *c* engages the bank contact connected with such line, while disappearing during the further sweep of this switch wiper, the above indicated potential conditions at the electrodes of the tube $Ro_1$ will be present only for a brief instant. The characteristic of the opposing potential is therefore such that the grid $G_1$ receives the opposing potential (e.g., +10 volt) only for a certain time interval (testing time) during the engagement of the wiper *c* with a bank contact. This testing interval terminates when a reliable stopping with the wiper *c* on the corresponding bank contact is not possible. There is, accordingly, a close connection between the testing time (interval) and the testing operation that must be concluded within such interval. If there is no idle test during such interval, the switch will move the wiper *c* to the next following bank contact and the operations are repeated.

As soon as the tube $Ro_1$ becomes conductive, a current will flow over the primary winding of the transformer *Tr* producing in the secondary winding an impulse which causes the tube $Ro_2$ to pass current. Accordingly, relay P in the plate circuit of this tube will energize in a circuit including contact *4p*. Relay P will close its contact *3p* thus causing simultaneous energization of the magnets $M_1$ and $M_2$ over their coils $M_1I$ and $M_2I$, thereby stopping the switch RW as already described.

When the tube $Ro_1$ passes current there will appear over its discharge path and the idle line reached by the wiper *c* a current causing a breakdown of the potential of −60 volt to the conducting potential of the tube, e.g., to −16 volt. This latter potential is now on the private conductor of the seized line forming a busy potential therefor. The resistance of the primary winding of the transformer may be neglected, and the seized line is therefore busied within an interval determined by the current rise in the testing circuit.

The relay P closes its contact *5p* before opening contact *4p* (make-before-break), thereby completing a holding circuit for its own winding over the closed contact *2c*. Contact *4p*, upon opening, extinguishes the tube $Ro_2$. At contact *6p*, the relay P connects a busy potential for the seized line and the tube $Ro_1$ is accordingly extinguished.

The operation of the switch RW shown in the example illustrated in Fig. 2 is controlled in the same manner as explained with reference to Fig. 1. The potential (−6 volt) which serves for defining the testing time is again induced in the windings II of the magnets $M_1$ and $M_2$, marked $M_1II$ and $M_2II$, respectively. However, this induced potential does not act as an opposing potential on the grid $G_1$ of the discharge tube $Ro_1$ but acts additively for the purpose of bringing the cathode potential of the discharge tube $Ro_1$ together with the idle potential of −60 volt over the resistor $Wi_{14}$ to the potential −66 volt as soon as the wiper *c* finds an idle line in the designated line groups. The identical potential of −66 volt will appear on the grids $G_1$ and $G_2$ of the discharge tube $Ro_1$, in a case for example, when the group II has been designated by setting the wiper of the switch MW on the bank contact 2, at a time when the wiper *c* of the switch RW engages the bank contact associated with group II, because, in such a case, the voltage source −72 volt which is raised to −66 volt at the occurrence of the impulse $P_2$ (+6 volt) causes at the grids $G_1$ and $G_2$ the identical potential conditions as they obtain at the cathode of the tube $Ro_1$. The rectifier G1 limits the potential at the cathode to −66 volt, thereby also equalizing fluctuations of the voltage induced in the windings II of the magnets $M_1$ and $M_2$.

The wipers of switch RW of Fig. 2 are stopped by the energization of relay P in the same manner as explained with reference to Fig. 1. Relay P also has a contact *6p* for maintaining the seized line busy. The busying takes place, as in Fig. 1, at the intant when the tube $Ro_1$ becomes conductive. The busy potential occurring at the instant of firing of the tube is in this case practically also formed by the pass voltage of the tube $Ro_1$ because the resistances of the windings II of the magnets $M_1$ and $M_2$ as compared with the internal resistance of the discharge tube, and the resistance of the primary winding of the transformer *Tr* may be neglected.

In Fig. 3, the potential (e.g., +30 volt), serving for defining and limiting the testing interval, is derived over capacitances directly from the magnets $M_1$ and $M_2$ without resort to second windings. The potential is conducted to a grid $G_3$ (e.g., a screen grid) which normally lies on −90 volt over the resistor $Wi_2$. At the grid $G_3$ is thereby produced a voltage, upon engagement of the wiper *c* with the private conductor of an idle line, which causes the tube $Ro_1$ to become conductive so as to stop the switch RW, it being of course assumed that the switch MW and the wiper *d* have been set as explained in connection with Figs. 1 and 2. Contact *p6* will again maintain busy potential on the seized line. The initial busy potential which appears at the private conductor of the seized line at the instant of firing of the tube $Ro_1$ is as in the former cases the potential at which the tube is maintained conductive and the circuit therefore corresponds in this respect to the one shown in Fig. 1.

Instead of producing the auxiliary potential, which is important for the limiting or defining of the test interval, by affecting the magnets $M_1$ and $M_2$ of the switch RW, it may be produced differently, e.g., by switching in an auxiliary current source by means of contact devices which are in suitable manner controlled by the switch RW. Such contact devices must of course be provided so as to produce an interval for the testing which terminates at an instant when reliable stopping cannot be accomplished.

Changes may be made within the scope and spirit of the appended claims.

I claim:

1. In an automatic telephone switch having circuit means including discharge tube means which co-operate in testing the idle and busy conditions of lines accessible to the switch over corresponding bank contacts respectively associated with said lines and engaged by movable wiper means forming part of said switch, a circuit arrangement for limiting the testing time interval, comprising means for enabling said discharge tube means to stop the switch with its wiper means in engagement with bank contacts of an idle line only in the simultaneous presence of an auxiliary potential acting on said discharge tube means, and means for connecting such auxiliary potential only once within an interval determined by the movement of said wiper means over the corresponding bank contacts during which interval the stopping of the movement of said wiper means can be reliably accomplished.

2. A structure and co-operation of parts as set forth in claim 1, comprising means for connecting said auxiliary potential to a grid of said discharge tube means.

3. A sturcture and co-operation of parts as set forth in claim 1, comprising means for connecting said auxiliary potential to the cathode of said discharge tube means.

4. A structure and co-operation of parts as set forth in claim 1, comprising magnets for driving the wipers of said switch, said auxiliary potential being produced by induction in said magnets.

5. A structure and co-operation of parts as set forth in calim 1, wherein a discharge space of said discharge tube means is connected in the busy test circuit of bank contact associated with lines reached by the switch wipers to cause said tube means to become conductive by the effect of a potential on the bank contacts of a line indicating that said line is idle, a current flowing thereafter over said line and said discharge space which causes a breakdown of the firing potential of said tube means to the pass a potential which forms the busy potential placed on the bank contacts of the corresponding idle line mark such line as a seized line.

6. A structure and co-operation of parts as defined in claim 5, comprising a further discharge tube, a transformer, said space discharge affecting the primary winding of said transformer to produce a current in the secondary winding thereof for firing said further discharge tube.

7. A structure and co-operation of parts as defined in claim 6, comprising a relay actuated responsive to firing of said further discharge tube, and circuit means controlled by said relay for stopping said switch and for maintaining the busy potential on the seized line.

References Cited in the file of this patent

UNITED STATES PATENTS

| | | |
|---|---|---|
| 2,640,883 | Buchner | June 2, 1953 |
| 2,647,165 | Buchner | July 28, 1953 |